United States Patent
Katayanagi et al.

(10) Patent No.: US 11,615,013 B2
(45) Date of Patent: Mar. 28, 2023

(54) CATALOG VERIFICATION DEVICE, CATALOG VERIFICATION METHOD, AND PROGRAM

(71) Applicant: Nippon Telegraph and Telephone Corporation, Tokyo (JP)

(72) Inventors: Ryota Katayanagi, Musashino (JP); Kensuke Takahashi, Musashino (JP); Nobuo Onai, Musashino (JP); Miwaka Otani, Musashino (JP); Satoshi Kondo, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 80 days.

(21) Appl. No.: 17/427,760

(22) PCT Filed: Jan. 29, 2020

(86) PCT No.: PCT/JP2020/003083
§ 371 (c)(1),
(2) Date: Aug. 2, 2021

(87) PCT Pub. No.: WO2020/166325
PCT Pub. Date: Aug. 20, 2020

(65) Prior Publication Data
US 2022/0121553 A1    Apr. 21, 2022

(30) Foreign Application Priority Data
Feb. 12, 2019    (JP) .............................. JP2019-022755

(51) Int. Cl.
*G06F 9/44*    (2018.01)
*G06F 11/36*    (2006.01)
(Continued)

(52) U.S. Cl.
CPC ............ *G06F 11/3616* (2013.01); *G06F 8/20* (2013.01); *G06F 8/38* (2013.01)

(58) Field of Classification Search
None
See application file for complete search history.

(56) References Cited

U.S. PATENT DOCUMENTS

| | | | |
|---|---|---|---|
| 9,977,653 B2* | 5/2018 | Elder | G06F 8/20 |
| 2014/0007082 A1* | 1/2014 | Berg | G06F 8/60 |
| | | | 717/177 |

(Continued)

OTHER PUBLICATIONS

Takahashi et al., "A System Architecture for Flexibility Coordination Fulfillment Among Multiple Service Providers," IEICE Communication Society Conference Correspondence Lecture, Sep. 12, 2017, p. 245, 3 pages (With English Translation).

*Primary Examiner* — Qamrun Nahar
(74) *Attorney, Agent, or Firm* — Fish & Richardson P.C.

(57) ABSTRACT

The present invention achieves automation of validation of a catalog created by a cooperative service catalog creator through a GUI. A catalog verification device 60 is a catalog verification device 60 that verifies the catalog created by the catalog creation assistance system that assists creation of the catalog used in the orchestrator 50. The catalog verification device 60 includes a BG cooperation function unit 61 that is a function unit for communicating with a catalog creation device 40 included in the catalog creation assistance system, and a catalog verification function unit 62 that verifies the catalog created by the catalog creation assistance system based on information acquired by the BG cooperation function unit 61, in which validation of the catalog is performed from perspectives of a mandatory check, a syntax check, and sequence of rules for cooperation among services by per- (Continued)

forming syntactic analysis of a file when the cooperative service catalog is created by and stored in the catalog creation assistance system.

15 Claims, 12 Drawing Sheets

(51) Int. Cl.
*G06F 8/20* (2018.01)
*G06F 8/38* (2018.01)

(56) References Cited

U.S. PATENT DOCUMENTS

| | | | | |
|---|---|---|---|---|
| 2015/0286374 | A1* | 10/2015 | Dibble | G06F 8/38 715/762 |
| 2016/0132808 | A1* | 5/2016 | To | G06Q 10/06315 705/7.25 |
| 2020/0371824 | A1* | 11/2020 | Secomandi | G06F 40/58 |

* cited by examiner

<VALIDATION EXAMPLE 1>
REFER TO PARAMETER INFORMATION UNIQUELY DEFINED IN COOPERATIVE SERVICE SPECIFICATION
⇒WHETHER ESSENTIAL/ARBITRARY CONSISTENCY IS ACHIEVED (MANDATORY CHECK)
(OMITTED)
{
    "name": "vas.gate.isSecure",
    "description": "vGW SSL enable",
    "validFor": {
      "startDateTime": "2016-12-20T00:00:00",
      "endDateTime": "2018-12-20T00:00:00"
    },
    "valueType": "String",
    "configurable": true,   → CHANGE: OK
    "default": false        → INITIAL VALUE: NO
    ]                       ⇒ IT MEANS THAT FOR PARAMETER REQUIRED FOR SERVICE, "INPUT IS REQUIRED"
},
(OMITTED)

Fig. 6C

```
<VALIDATION EXAMPLE 2>
REFER TO ORDER INPUT SEQUENCE OF MATERIAL SERVICE AT TIME OF ADDITION OR CHANGE IN RULES
⇒CHECK WHETHER MATERIAL SERVICE TO WHICH REFERENCE IS MADE IS CORRECT (SYNTAX CHECK)
"sourceOffering": [                        CATALOG INFORMATION TO WHICH
  "add": [                                 REFERENCE IS MADE WHEN ORDER IS ADDED
    "http://apio.ntt.co.jp/catalogManagement/v1/productOffering/23",   ⇒CHECK WHETHER TO MATCH CATALOG TO
    "http://apio.ntt.co.jp/catalogManagement/v1/productOffering/24"    WHICH REFERENCE IS MADE IN COOPERATIVE
  ],                                       SERVICE CATALOG
(OMITTED)
<VALIDATION EXAMPLE 3>
REFER TO PARAMETER USED FOR SETTING IN EACH PROCEDURE OF ORDER INPUT
⇒ENSURE THAT VALUE OF PARAMETER IS DETERMINED BY INPUT ORDER AND INITIAL VALUE IN TERMS OF SPECIFICATION, OR LAST ORDER PROCESS,
AND THAT THERE IS NO PROBLEM IN TERMS OF PROCEDURE (CHECK OF SEQUENCE OF RULES FOR COOPERATION AMONG SERVICES)
"sourceOrderSetting": [
  "addRules": [
    "receivedOrderRules": [
      {
        "actions": [
          {
            "action": "SET",
            "target": [
              {
                "scope": "$order(http://apio.ntt.co.jp/catalogManagement/v1/productOffering/23)",
                "attributes": [
                  {
                    "name": "externalId",           ⎫
                    "value": "$parentOrder.externalId"   ⎪
                  },                                      ⎬ PARAMETER INFORMATION TO BE INPUT TO
                  {                                       ⎪ API SIDE AT TIMING TO ADD ORDER
                    "name": "$item(1).billingAccount.1.href",  ⎪ ⇒CHECK WHETHER ALL VALUES HAVE
                    "value": "$parentOrder.$item(1).billingAccount.1.href"  ⎭ ALREADY BEEN SET ON HIGHER LEVEL SIDE
                  },                                             AT TIME OF RECEPTION OF ORDER
(OMITTED)
```

CATALOG VERIFICATION DEVICE, CATALOG VERIFICATION METHOD, AND PROGRAM

CROSS-REFERENCE TO RELATED APPLICATIONS

This application is a National Stage application under 35 U.S.C. § 371 of International Application No. PCT/JP2020/003083, having an International Filing Date of Jan. 29, 2020, which claims priority to Japanese Application Serial No. 2019-022755, filed on Feb. 12, 2019. The disclosure of the prior application is considered part of the disclosure of this application, and is incorporated in its entirety into this application.

TECHNICAL FIELD

The present invention relates to a catalog verification device, a catalog verification method, and a program.

BACKGROUND ART

A tool and a method for providing a GUI and assisting catalog creation have come into wide use (for example, OpenStack Heat Dashboard, and AWS CloudFormation Designer). Such a conventional catalog creation assistance tool enables visual definition of a service configuration on the GUI provided by a servicer, thereby facilitating the catalog creation. By operating the GUI, the catalog can be validated from perspectives of a mandatory check and a syntax check. However, in the conventional catalog creation assistance tool, servicers provide their GUIs unique to each service. Therefore, the scope of the orchestration is limited within the servicer, which makes it impossible to achieve the orchestration of the services (cooperative service) in which multiple services are cooperated with one another.

Figure 9:
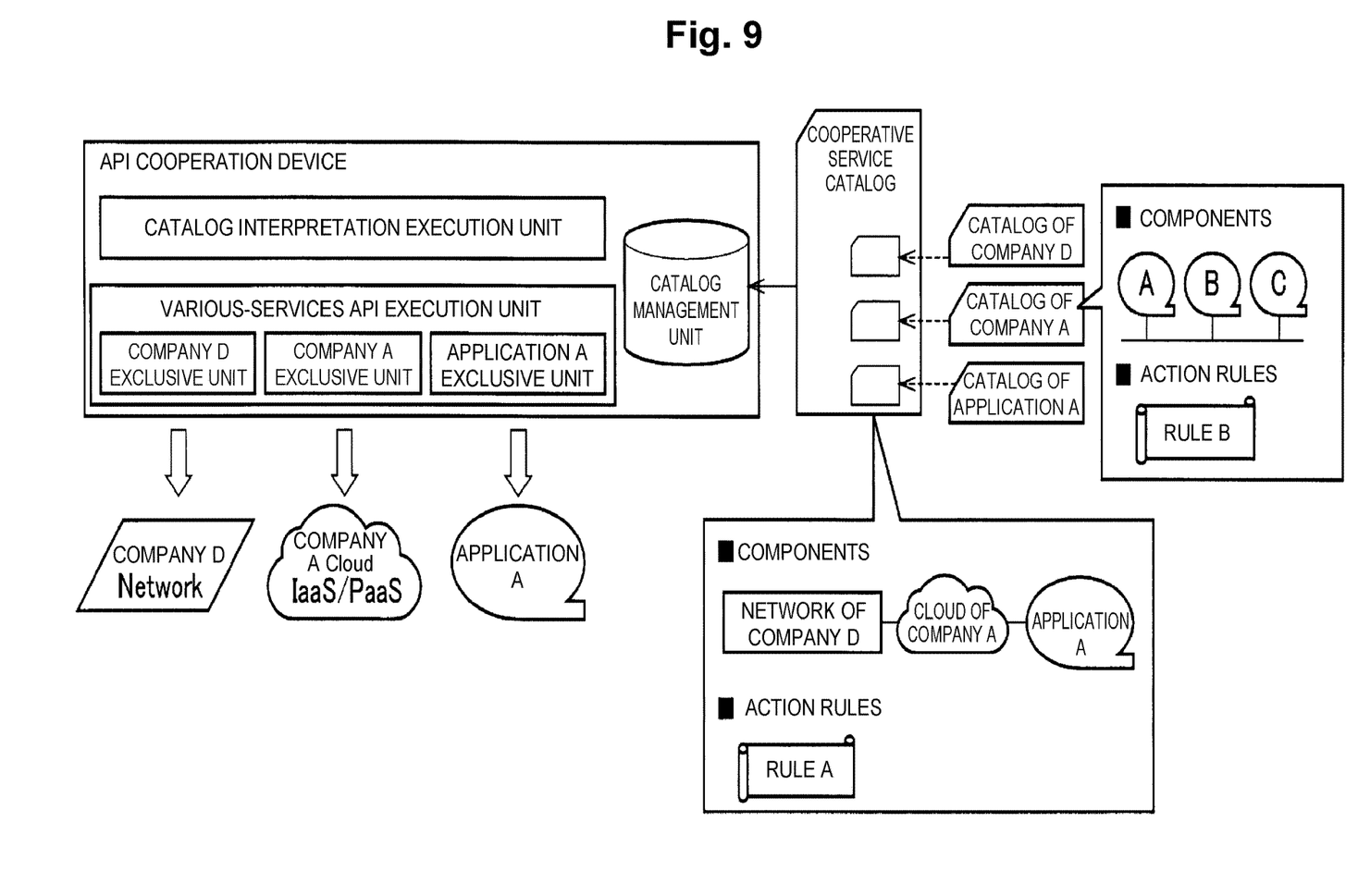
FIG. 9 is a diagram for explaining a conventional technology.

As an orchestration technology relating to the cooperative service, there is known "architecture for providing flexible service cooperation among multiple providers" employing the catalog-driven architecture (see Non-Patent Literature 1). In Non-Patent Literature 1, as illustrated in FIG. 9, the cooperative service specification is defined by creating a catalog for each service and a cooperative service catalog and associating the catalog for each service with the cooperative service catalog.

CITATION LIST

Non-Patent Literature

Non-Patent Literature 1: IEICE Communications Society Conference, Sep. 12, 2017, B-14-8, Architecture for providing flexible service cooperation among multiple providers, Kensuke Takahashi et al (NTT)

SUMMARY OF THE INVENTION

Technical Problem

However, regarding the cooperative service catalog, the validation function of the rules defining cooperation for each component and cooperation among components has not been established. Even though automation is to be made possible in the future for design and construction of new cooperative service by combining a wide variety of services by the orchestrator, a cooperative service provider needs to understand the specifications of API operated by the service acting as a component and perform the validation of the own cooperative service catalog created by the provider itself uniquely for each cooperative service, if the validation scheme is not established at the time of creation of a cooperative service catalog by the orchestrator.

In view of the above circumstances, automation of not only creation of the cooperative service catalog but also the validation of the catalog are required to reduce the skill and labor required from creation of the cooperative service catalog until the construction and operation through the orchestrator. However, there is a problem in that in the case of developing a validation tool for each cooperative service, the cooperative service provider needs to redevelop the tool each time the service serving as a component is added or the specification is changed.

The present invention has an object to provide a catalog verification device that automates validation of a catalog created by a cooperative service catalog creator through a GUI, a catalog verification method, and a program.

Means for Solving the Problem

The invention according to a first aspect provides a catalog verification device that verifies a catalog created by a catalog creation assistance system that assists creation of the catalog used in an orchestrator, the catalog verification device including a BG (background) cooperation function unit hat is a function unit for communicating with a catalog creation device included in the catalog creation assistance system, and a catalog verification function unit that verifies the catalog created by the catalog creation assistance system based on information acquired by the BG cooperation function unit, wherein validation of the catalog is performed from perspectives of a mandatory check, a syntax check, and sequence of rules for cooperation among services by performing syntactic analysis of a file when the catalog for a cooperative service is created by and stored in the catalog creation assistance system.

In the invention according to a second aspect according to the invention according to the first aspect, the validation scheme is a validation scheme in light of a description of the catalog, targeted for the cooperative service catalog.

In the invention according to a third aspect according to the invention according to the second aspect, the validation scheme is a validation scheme of acquiring information required for validation of a cooperative service based on a reference relationship among the catalogs.

In the invention according to a fourth aspect according to the invention according to the second aspect, the validation scheme is a validation scheme targeted for a mandatory check, a syntax check, and a check of rules for cooperation among services.

In the invention according to a fifth aspect according to the invention according to the second aspect, the validation scheme is a validation scheme applicable independently of a type and a content of the service.

The invention according to a sixth aspect provides a catalog verification method of verifying a catalog created by a catalog creation assistance system that assists creation of the catalog used in an orchestrator, the method of causing the catalog verification device to perform a BG cooperation step of communicating with a catalog creation device included in the catalog creation assistance system, and a catalog verification step of verifying the catalog created by the catalog creation assistance system based on information acquired in the BG cooperation step, wherein validation of the catalog is performed from perspectives of a mandatory check, a syntax check, and sequence of rules for cooperation among services by performing syntactic analysis of a file when the catalog for a cooperative service is created by and stored in the catalog creation assistance system.

The invention according to a seventh aspect provides a program for causing a computer to function as the catalog verification device according to any one of the first to fifth aspects.

Effects of the Invention

According to the present invention, there can be provided a catalog verification device that automates validation of a catalog created by a cooperative service catalog creator through a GUI, a catalog verification method, and a program.

DESCRIPTION OF EMBODIMENTS

Hereinafter, embodiments of the present invention will be described with reference to drawings. In the description of the following drawings, the same or like reference sign denotes the same or like part.

Overview

The present applicant proposes a "catalog creation assistance system, a catalog creation assistance method, and a program" as a technology for easily creating a wide variety of catalogs used in an orchestrator to which the technology of Non-Patent Literature 1 is applied (Japanese Patent Application No. 2019-005140). The technology of Japanese Patent Application No. 2019-005140 achieves intuitive creation of a catalog using a GUI and cooperation with an orchestrator body. The present invention extends the technology of Japanese Patent Application No. 2019-005140 to assisting of a catalog creator by automatically performing validation from the perspectives of a mandatory check, a syntax check, and the sequence of rules for cooperation among services at the time of catalog creation and DB registration.

Problem to be Solved by the Present Invention and Features of the Invention

There is an underlying problem in that when a catalog creator creates a catalog in a plain text, labor is required to confirm the relationship and dependence among catalogs, which makes it difficult to create the catalog. Hence, the present invention aims to automate the validation of the catalog created by the cooperative service catalog creator through the GUI.

As a derivative problem resulting from the above-described problem, there is a problem in that "in the case of developing a validation function for each cooperative service, there is a risk of redevelopment required due to addition of the component and/or a specification change. To solve the derivative problem, the present invention provides a solution to "develop a framework that performs validation of the catalog from the perspectives of a mandatory check, a syntax check, and sequence of rules for cooperation among services by performing syntactic analysis of a file when the cooperative service catalog information is created by and stored in a system having a catalog creation assistance function."

In this way, the present invention is characterized in the validation schemes. Although details will be described later, a feature 1 of the present invention is a "validation scheme in light of the description of the catalog, targeted for the cooperative service catalog." In the feature 1, the following feature 1-1, feature 1-2, and feature 1-3 are included. The feature 1-1 is a "validation scheme of acquiring information required for the validation of the cooperative service based on a reference relationship among the catalogs." The feature 1-2 is a "validation scheme targeted for a mandatory check, a syntax check, and a check of rules for cooperation among services." The feature 1-3 is a "validation scheme applicable independently of the type and content of the service."

(System Configuration)

Figure 1:
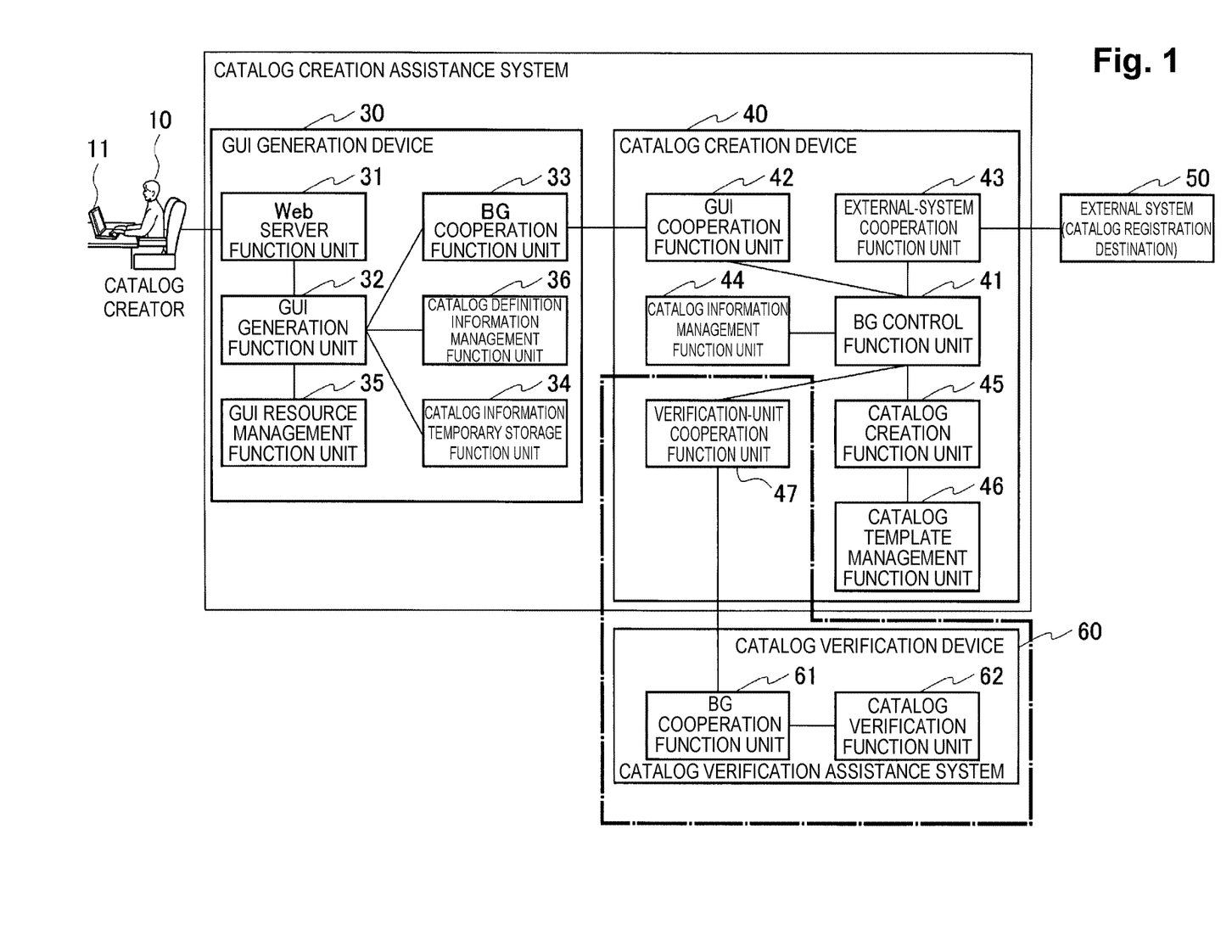
FIG. 1 is a functional block diagram of a catalog creation assistance system incorporating a catalog verification assistance system in an embodiment of the present invention.

FIG. 1 is a functional block diagram of a catalog creation assistance system incorporating a catalog verification assistance system according to an embodiment of the present invention. Here, there is assumed a case where in the B2B2X (Business To Business To X) service, a Second B creates a cooperative service catalog with which a service catalog of a First B is cooperated. The catalog verification assistance system is adapted to acquire the information on validation from the service catalog of the First B and perform a validation check on the cooperative service catalog of the Second B.

Specifically, as illustrated in FIG. 1, the catalog creation assistance system is a system that assists creation of a catalog used in an orchestrator, the system including a GUI generation device 30 and a catalog creation device 40. A unit in which a verification-unit cooperation function unit 47 is added to a catalog verification device 60 is referred to as a "catalog verification assistance system." A catalog creator 10 can communicate with the catalog creation assistance system using a PC 11 in which a browser is installed. The catalog creation assistance system is communicably connected to another system (orchestrator) 50 which is a catalog registration destination.

The GUI generation device 30 is a device that generates a GUI, the device functionally including a Web server function unit 31, a GUI generation function unit 32, a BG cooperation function unit 33, a catalog information temporary storage function unit 34, a GUI resource management function unit 35, and a catalog definition information management function unit 36. The Web server function unit 31 provides a GUI function in response to an HTTP request from the browser. The GUI generation function unit 32 performs an execution control in response to each request from the browser. The BG cooperation function unit 33 stores catalog information in a BG (background) and provides an information acquisition function from the other system 50. The catalog information temporary storage function unit 34 stores the catalog information upon receipt of a storage request from the browser and provides a referential function of the catalog information at the time of creation of the catalog. The GUI resource management function unit 35 provides a management function for each image displayed by the GUI. The catalog definition information management function unit 36 registers catalog definition information for displaying a catalog creation screen and provides a referential function of the catalog definition information.

The catalog creation device 40 is a device (a device providing a BG function) that creates a catalog, the device functionally including a BG control function unit 41, a GUI cooperation function unit 42, an another-system cooperation function unit 43, a catalog information management function unit 44, a catalog creation function unit 45, a catalog template management function unit 46, and the verification-unit cooperation function unit 47. The BG control function unit 41 performs an execution control in response to each request from the GUI. The GUI cooperation function unit 42 stores the catalog information from the GUI and receives a registration request to be issued to the other system 50. The another-system cooperation function unit 43 registers, updates and deletes the catalog for the other system 50, and performs an acquisition process of the catalog information. The catalog information management function unit 44 stores the catalog information upon receipt of a storage request from the GUI, and provides a referential function of the catalog information at the time of creation of the catalog. The catalog creation function unit 45 creates a catalog for requesting the other system 50 based on stored catalog template information. The catalog template management function unit 46 stores the catalog template information and provides a referential function from the catalog creation function unit 45. The verification-unit cooperation function unit 47 is a function unit for communicating with the catalog verification device 60.

The catalog verification device 60 is a device that verifies the catalog created by the catalog creation assistance system, the device including a BG cooperation function unit 61 and a catalog verification function unit 62. The BG cooperation function unit 61 is a function unit for communicating with the catalog creation device 40. The catalog verification function unit 62 verifies the catalog created by the catalog creation assistance system based on the information acquired by the BG cooperation function unit 61.

(Benefit and Target)

Figure 2:
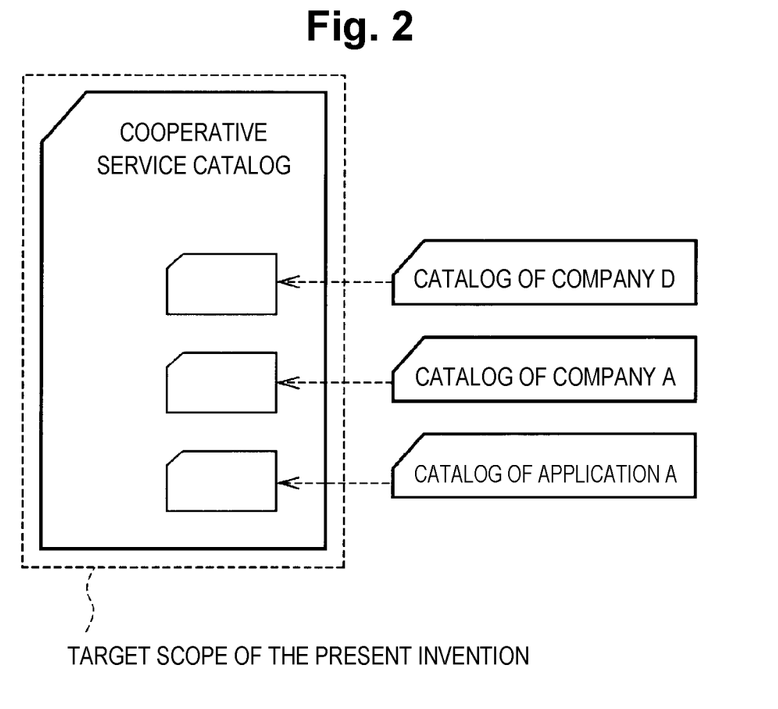
FIG. 2 is a diagram for explaining a target scope of the present invention.

A benefit of the present invention is that, for the catalog creator 10, "it is unnecessary to manually perform validation of the created catalog for a cooperative service." As precondition for the benefit, the validation shall be normally performed by each servicer from the perspectives of a mandatory check and a syntax check of the service catalog serving as a component of the cooperative service. That is, as illustrated in FIG. 2, the mandatory/syntax validation of a parameter of a component service has been already performed in the existing technology.

(Feature 1)

Figure 3:
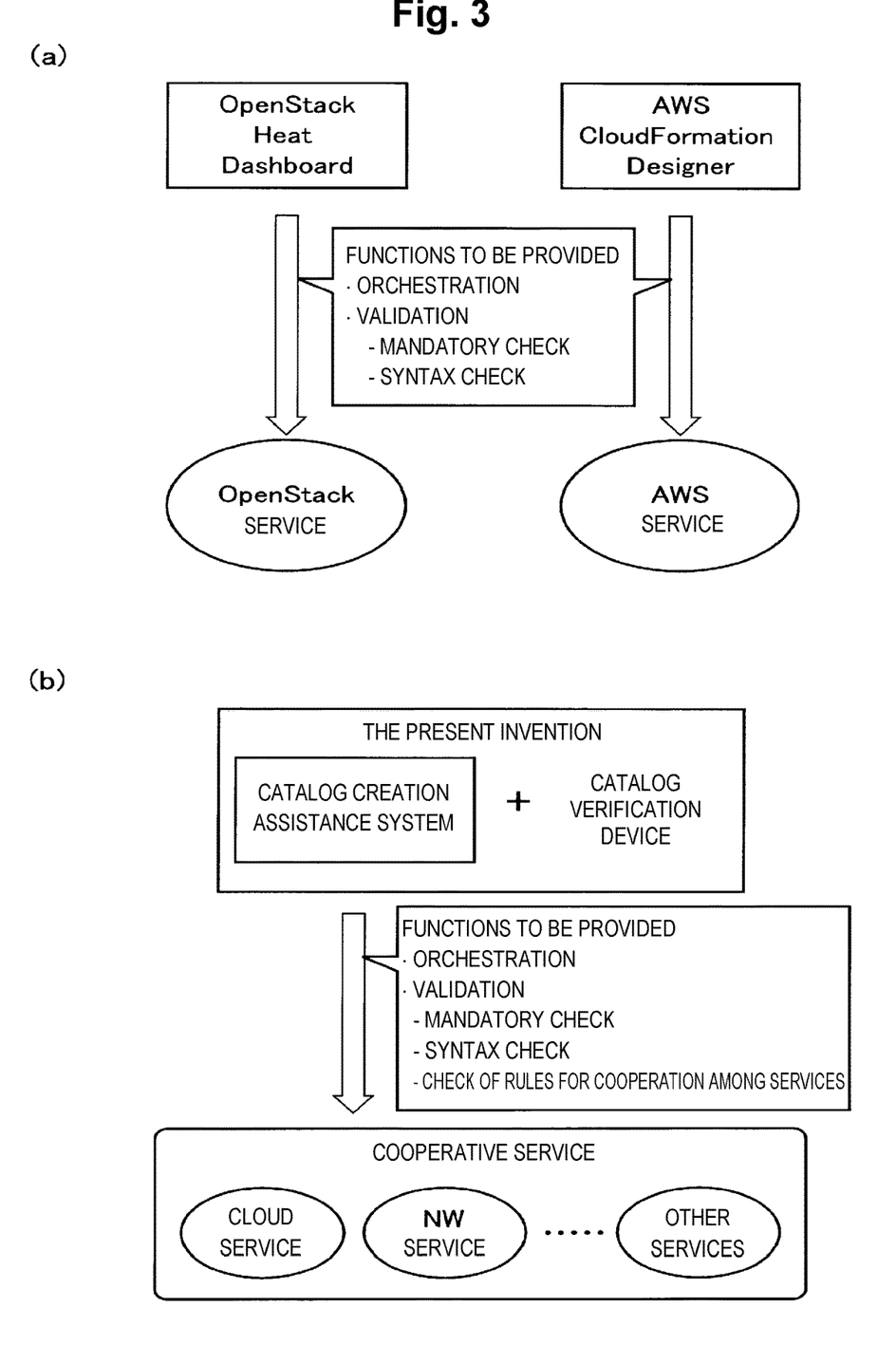
FIG. 3 is a diagram for explaining a feature 1 of the present invention.

FIG. 3 is a diagram for explaining a feature 1 of the present invention, in which FIG. 3(A) illustrates the existing technology and FIG. 3(B) illustrates the present invention. In FIG. 3(B), the scope of "the catalog creation system+the catalog verification device" is referred to as the present invention, but, of course, the technical scope of the present invention should be interpreted based on the scope of the claims, and is not limited to the scope shown in FIG. 3.

The feature 1 of the present invention is a "validation scheme in light of the description of the catalog, targeted for the cooperative service catalog." That is, the existing technology (e.g., OpenStack Heat Dashboard and AWS Cloud-Formation Designer) provides an orchestration for each servicer and enables the validation of the catalog from the perspectives of a mandatory check and a syntax check, as illustrated in FIG. 3(A). The present invention provides not only the validation for each servicer but also a validation function targeted for the "cooperative service" in which multiple services provided by different servicers are cooperated with one another, as illustrated in FIG. 3(B).

(Feature 1-1)

Figure 4A:
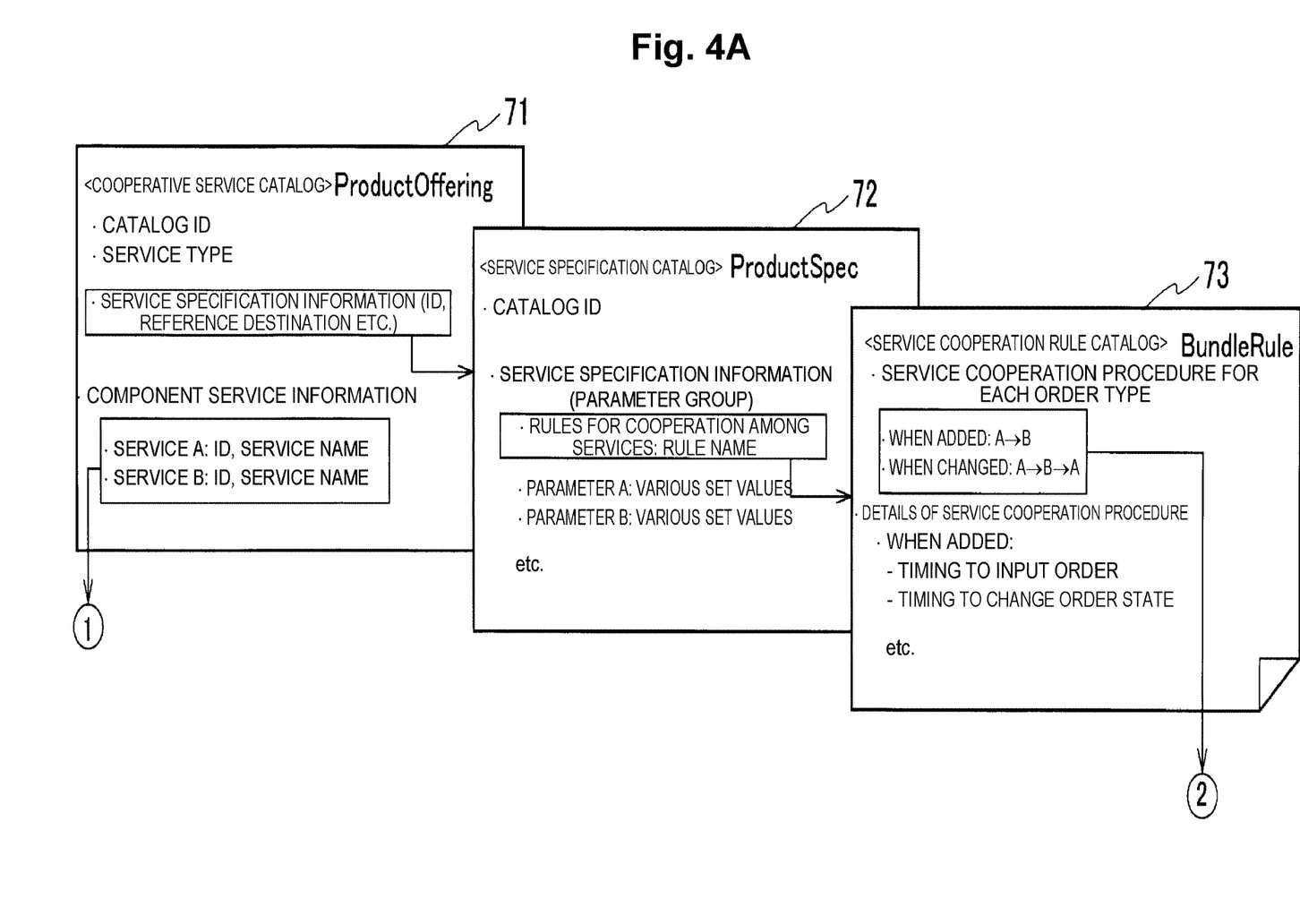
FIG. 4A is a diagram for explaining a feature 1-1 of the present invention.
Figure 4B:
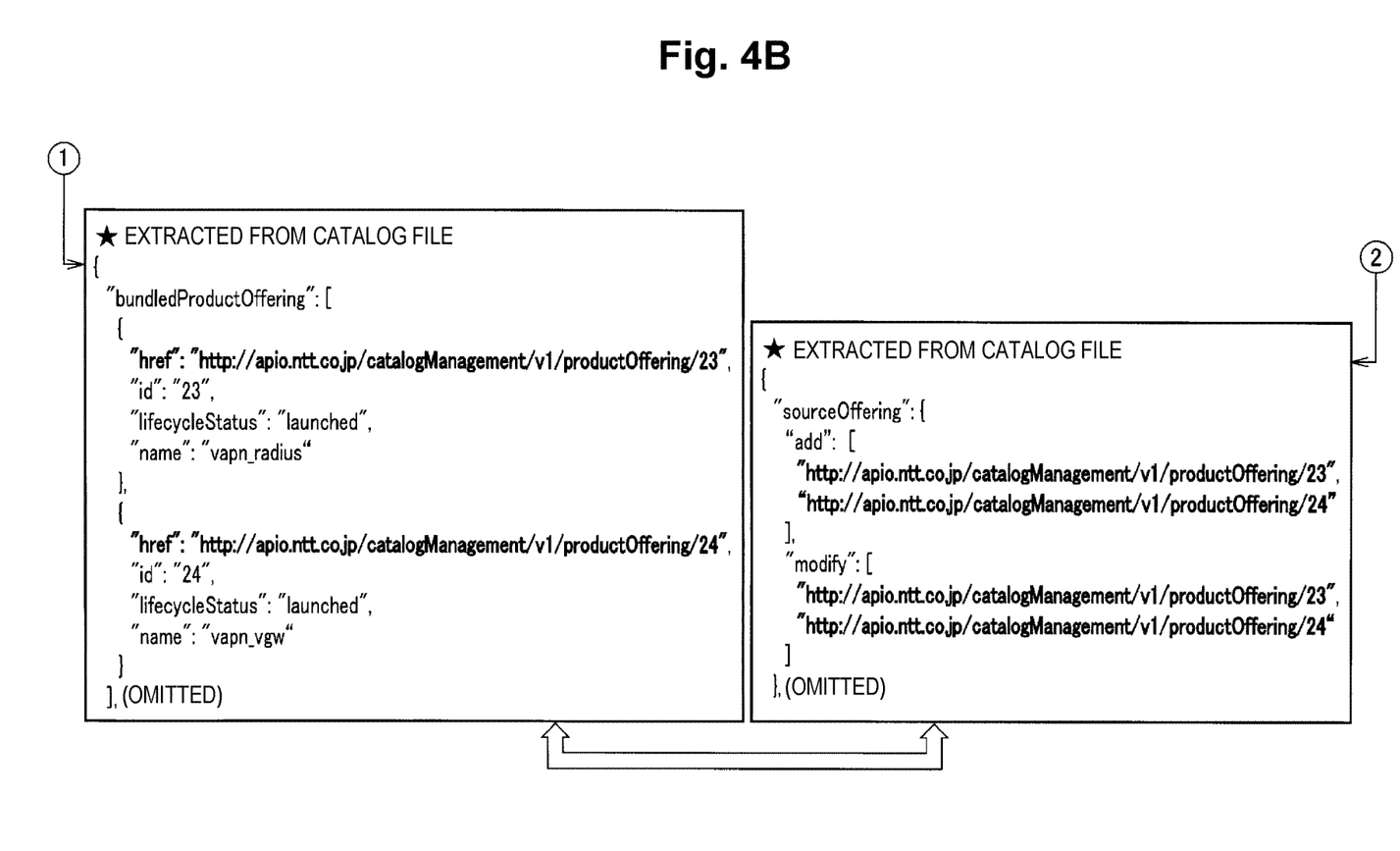
FIG. 4B is a diagram for explaining a feature 1-1 of the present invention.

FIG. 4A and FIG. 4B each are a diagram for explaining a feature 1-1 of the present invention. The feature 1-1 of the present invention is a "validation scheme of acquiring information required for the validation of the cooperative service based on a reference relationship among the catalogs." That is, the present invention proposes the validation scheme of acquiring the information required for the validation of the cooperative service, such as "information of a material service catalog," "parameters inherent in the cooperative service," and "rules for cooperation among services" by interpreting the reference relationship among the catalogs.

Specifically, as illustrated in FIGS. 4A and 4B, a cooperative service catalog 71 is a catalog as one cooperative service in which several services are combined. A service specification catalog 72 is a catalog in which a specification inherent in the cooperative service is defined. A service cooperation rule catalog 73 is a catalog in which rules for cooperation among services are defined.

In the cooperative service catalog 71, a list of individual services constituting the cooperative service as well as a service specification inherent in the cooperative service are included. Therefore, the mandatory check and the syntax check can be performed in the frame of the specifications of the individual services (component services) according to the specifications of the respective component services constituting the cooperative service. On the other hand, to check the rules for cooperation among services, it is necessary to trace the detailed description of the specification inherent in the service based on the service specification inherent in the cooperative service and refer to the service cooperation procedure of the service cooperation rule catalog 73. When thus tracing to the service cooperation rule catalog 73, it is possible to acquire the information required for the validation of the cooperative service.

As described above, in the present invention, the validation scheme includes (1) acquiring the catalog information to which the cooperative service catalog 71 refers. In addition, the validation scheme includes (2) interpreting the catalog to which reference is made in the same manner as (1) and acquiring a parameter group defined in terms of the service cooperation rule catalog 73 and the service specification. Furthermore, the validation scheme includes (3) perform collation of the acquired information to perform the validation of the cooperative service. When thus acquiring the required information from the reference relationship, it is possible to perform the validation with the information among the catalogs.

(Feature 1-2)

Figure 5:
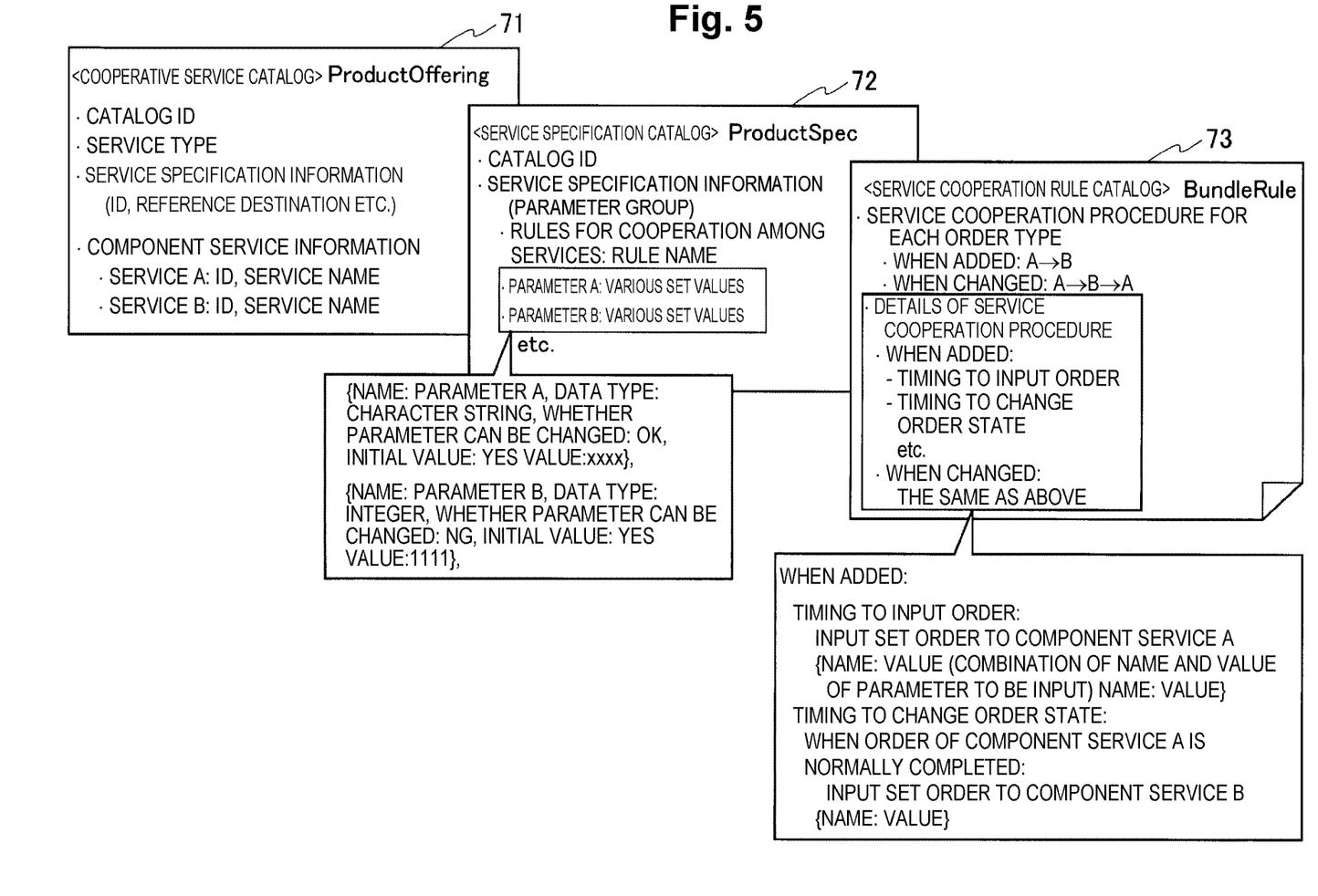
FIG. 5 is a diagram for explaining a feature 1-2 of the present invention.

FIG. 5 is a diagram for explaining a feature 1-2 of the present invention. The feature 1-2 of the present invention is a "validation scheme targeted for a mandatory check, a syntax check, and a check of rules for cooperation among services." That is, in the present invention, the validation is performed from the perspective of the sequence of rules for cooperation among services in addition the perspectives of a mandatory check and a syntax check that are performed in a phase of creating the catalog by the GUI as a commercial technology.

For example, when a certain process P1 of a service A, a certain process P2 of a service B, and a certain process P3 of the service A are performed in this order, the parameters required to perform the respective processes P1, P2, and P3 are defined. It is adapted to check whether the required parameter is received from "another cooperative service" at the timing when each of the processes P1, P2, and P3 is performed.

Specifically, as illustrated in FIG. 5, in the service specification catalog 72, there are defined a parameter used in terms of the service specification, information as to whether the parameter can be changed, and information concerning the presence or absence of an initial value of the parameter. The information as to whether the parameter can be changed is information indicating whether the parameter is rewritten in the middle of the process. The initial value is a value initially input at the timing when the cooperative service is performed.

On the other hand, in the service cooperation rule catalog 73, there is defined the input sequence of the orders/parameters defined in a higher-level catalog. For example, it is defined that when an order is input newly, a set order is input firstly to the component service A. In addition, a combination of a name and value of the parameter to be input is also defined. Furthermore, it is defined that when the order of the component service A is normally completed, the set order is input to the component service B.

Therefore, it can be confirmed that there is no problem from the perspectives of the mandatory check, the syntax check and the sequence of rules for cooperation by collating of the parameters included in the cooperative service specification with the cooperation procedure included in the rules for cooperation among services. For example, when a command to input a value of the parameter A to the service B is issued in a state in which the parameter A has no initial value and no value is set for the parameter A, the order does not work well. Therefore, it is possible to determine that there is a problem from the perspective of the order of the rules for cooperation among services.

Figure 6A:
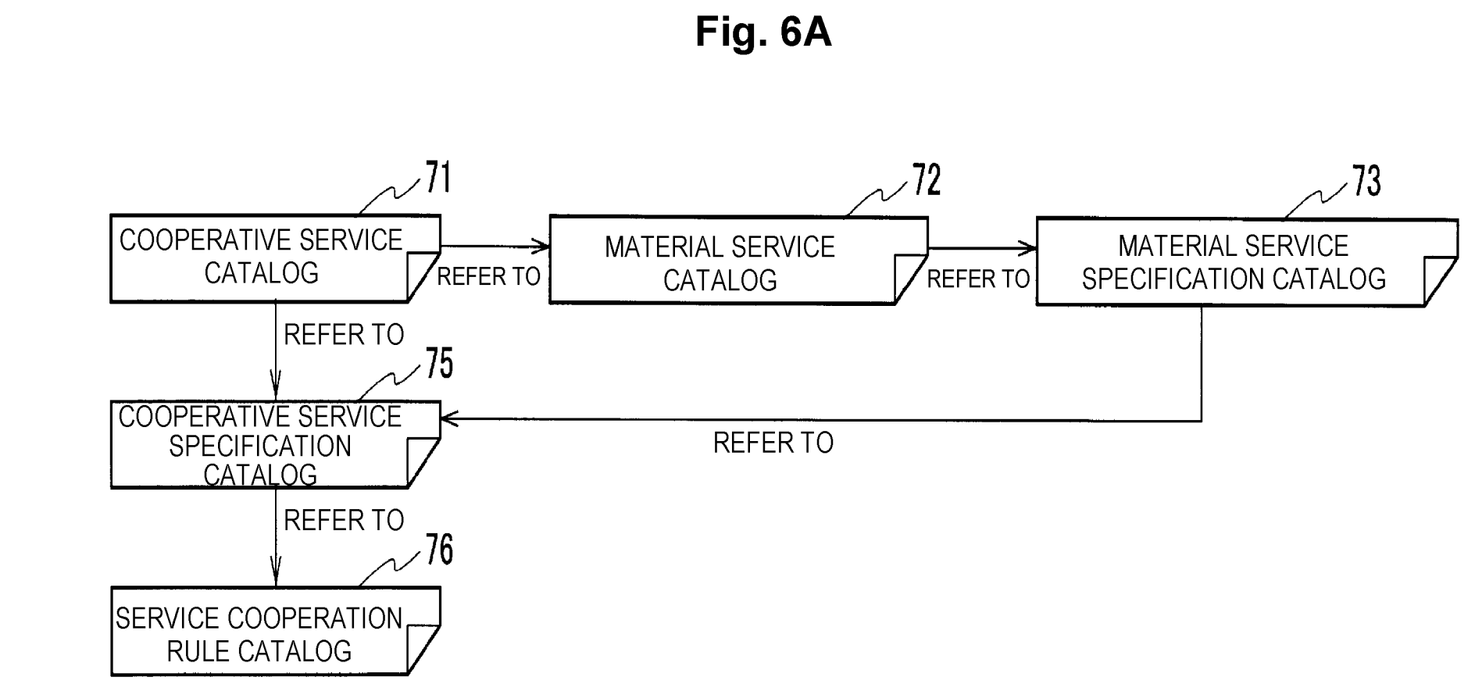
FIG. 6A is a diagram illustrating an example of a feature 1-2 of the present invention.
Figure 6B:
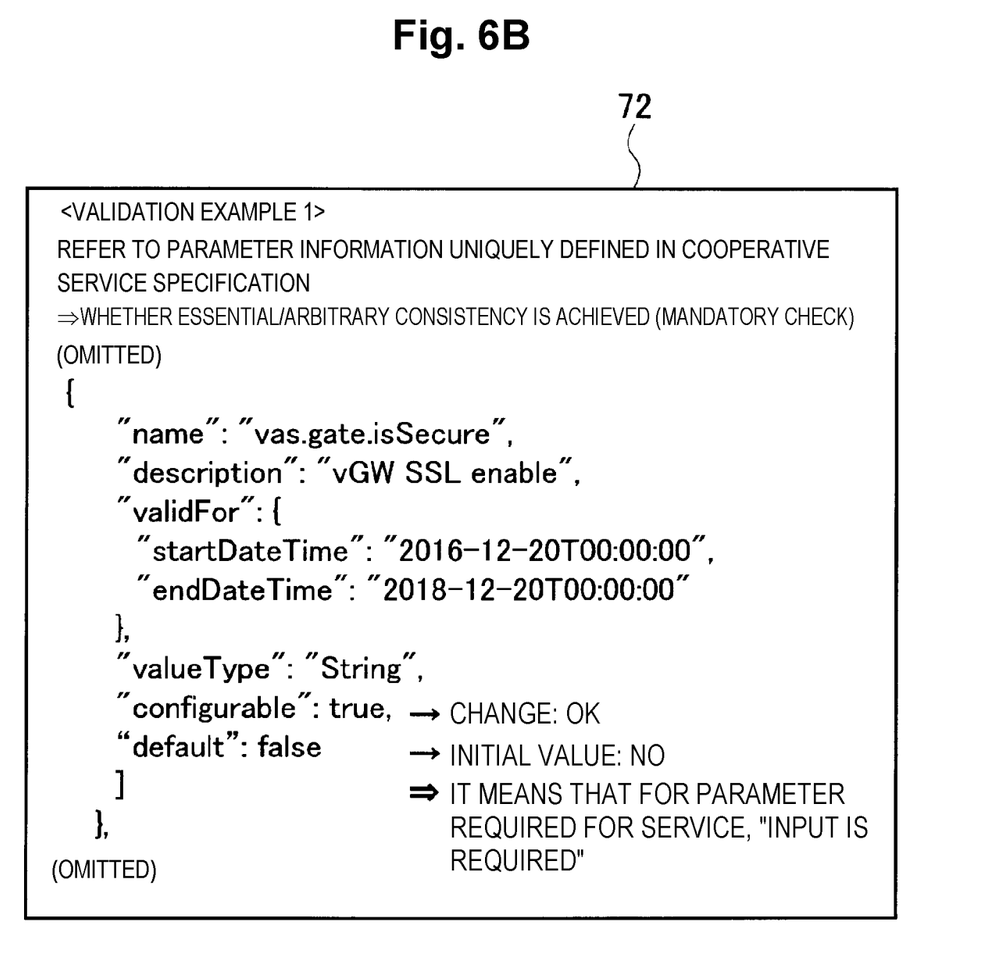
FIG. 6B is a diagram illustrating an example of a feature 1-2 of the present invention.
Figure 6C:
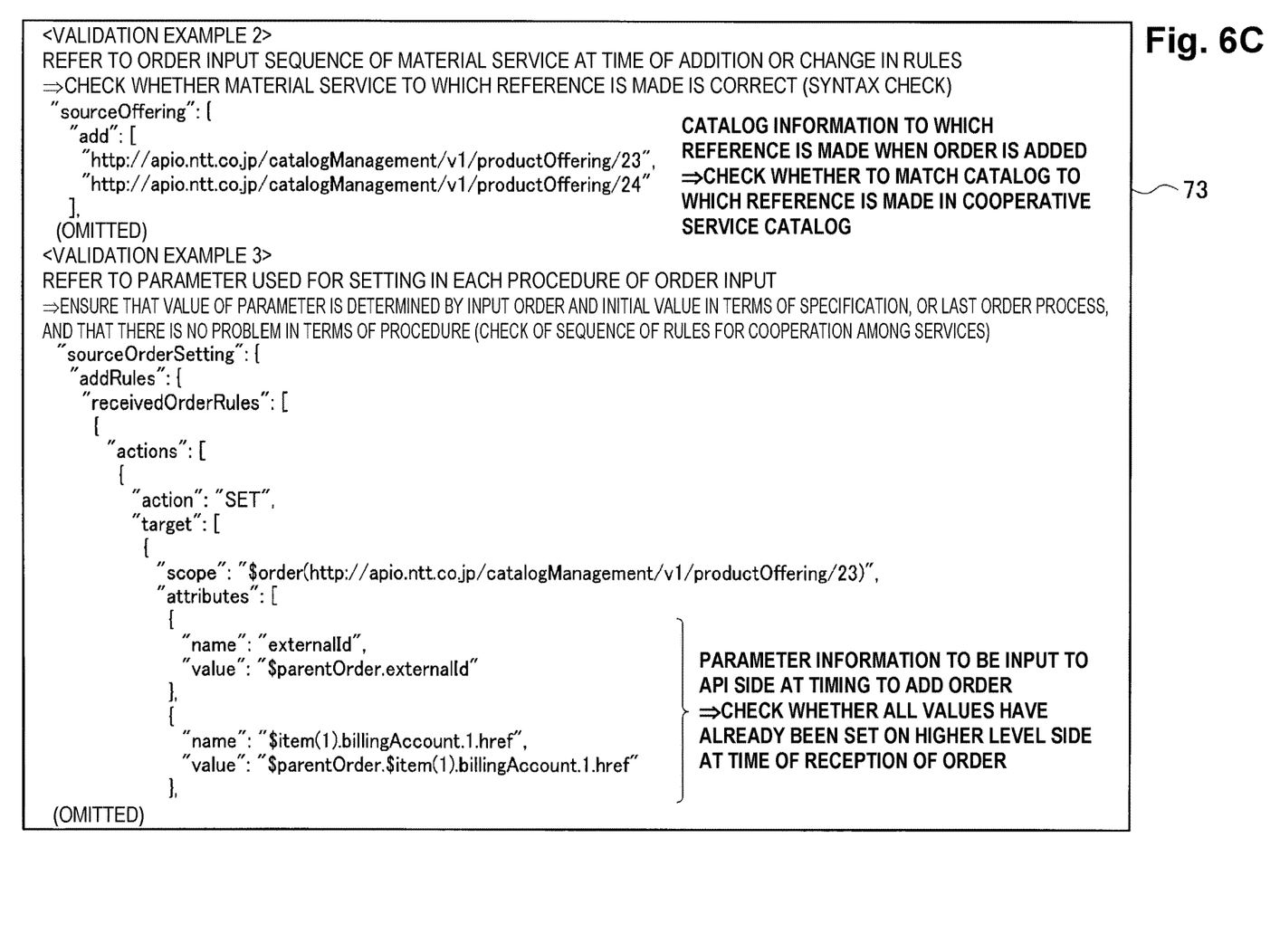
FIG. 6C is a diagram illustrating an example of a feature 1-2 of the present invention.

FIGS. 6A, 6B, and 6C each are a diagram illustrating an example of the feature 1-2 of the present invention. Here, the figures each illustrate an example of a reference relationship among the cooperative service catalog 71, the cooperative service specification catalog 72, the service cooperation rule catalog 73, a material service catalog 75, and a material service specification catalog 76. For example, the cooperative service specification catalog 72 is adapted to refer to the parameter information uniquely defined in the cooperative service specification, and check whether essential/arbitrary consistency is achieved (mandatory check). The service cooperation rule catalog 73 is adapted to refer to the order input sequence of the material service when added or changed in the rules and check whether the material service to which reference is made IS CORRECT (syntax check). Furthermore, the service cooperation rule catalog 73 is adapted to refer to a parameter used for setting in each procedure of the order input, and check that a value of the parameter is determined by the input order and the initial value in terms of the specification, or the last order process and that there is no problem in terms of the procedure (check of the sequence of rules for cooperation between services).

(Feature 1-3)

Figure 7:
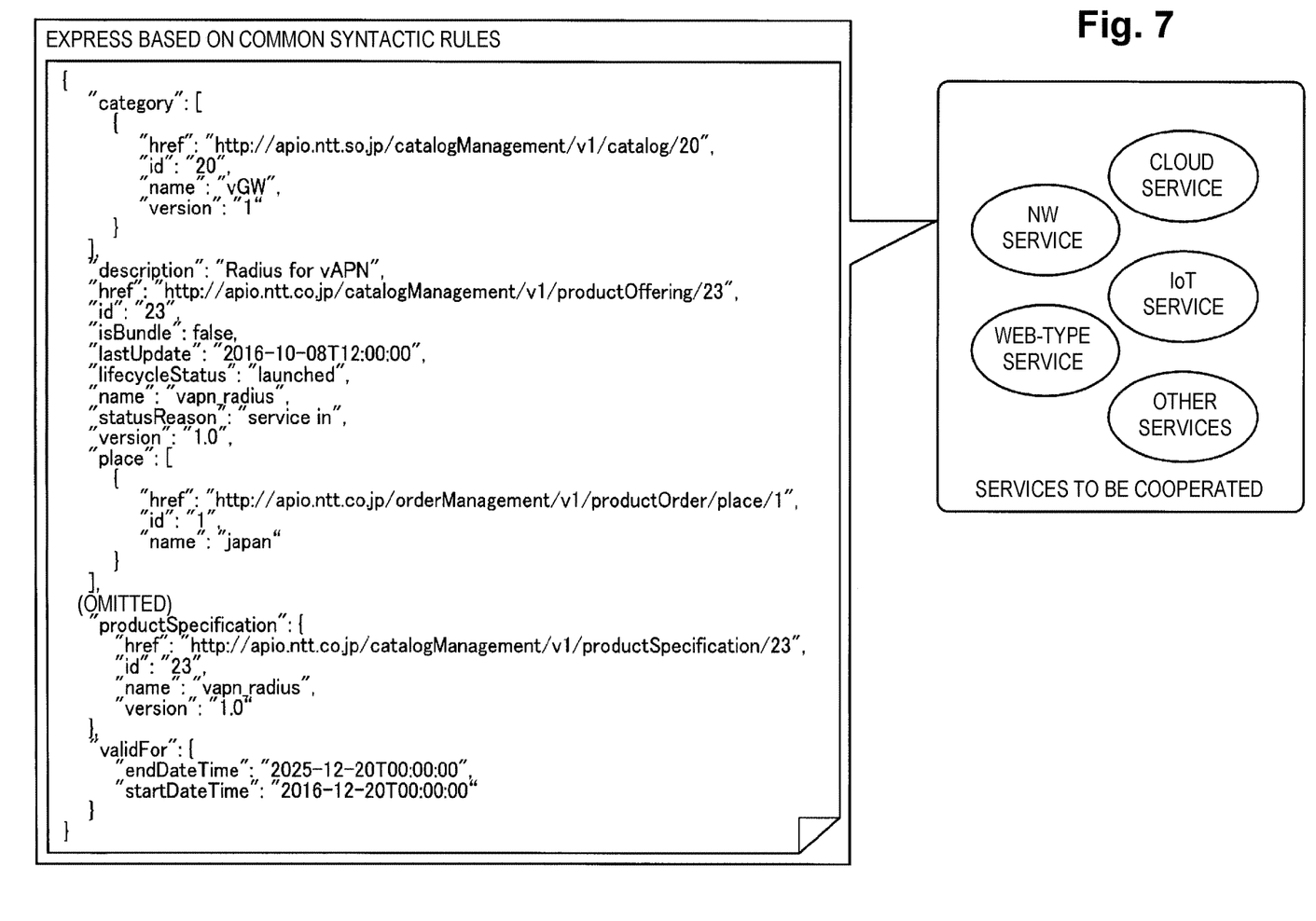
FIG. 7 is a diagram for explaining a feature 1-3 of the present invention.

FIG. 7 is a diagram for explaining a feature 1-3 of the present invention. The feature 1-3 of the present invention is a "validation scheme applicable independently of the type and content of the service." That is, since the syntactic rules for the catalog is independent of the type and content of the service, the present invention can be applied to a wide range of fields without limiting the service to be cooperated. Specifically, as illustrated in FIG. 7, the present invention can be applied to various services to be cooperated, such as an NW service, a Web-type service, a cloud service, and an IoT service, by expressing the catalog based on the common syntactic rules.

(Operation Image)

Figure 8:
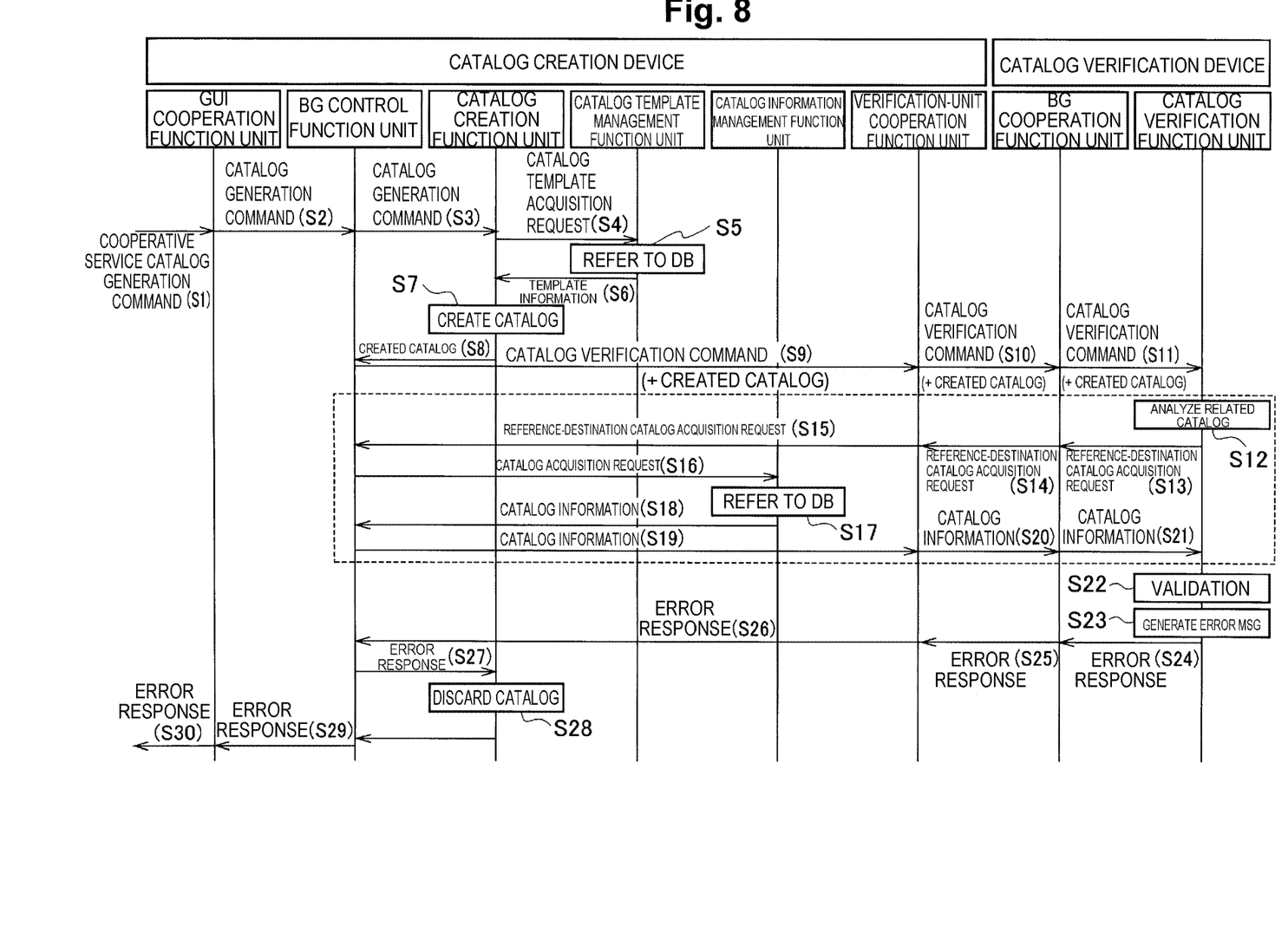
FIG. 8 is a sequence diagram illustrating an operation example of the catalog creation assistance system incorporating the catalog verification assistance system according to the embodiment of the present invention.

FIG. 8 is a sequence diagram illustrating an operation example of the catalog creation assistance system incorporating the catalog verification assistance system according to the embodiment of the present invention. Here, the GUI generation device 30 of the catalog creation assistance system is not illustrated.

Firstly, a cooperative service catalog generation command is issued from the GUI generation device 30 to the catalog creation device 40. Upon receipt of the cooperative service catalog generation command, the GUI cooperation function unit 42 issues a catalog generation command to the BG control function unit 41 (step S1→step S2). The catalog generation command is passed to the catalog creation function unit 45 through the BG control function unit 41 (step S3).

Upon receipt of the catalog generation command, the catalog creation function unit 45 issues a catalog template acquisition request to the catalog template management function unit 46 (step S4). Upon receipt of the catalog template acquisition request, the catalog template management function unit 46 refers to a DB and returns catalog template information to the catalog creation function unit 45 (step S5→step S6). Upon receipt of the catalog template information, the catalog creation function unit 45 creates a catalog and passes the created catalog to the BG control function unit 41 (step S7→step S8).

Upon receipt of the created catalog, the BG control function unit 41 issues a catalog verification command for the created catalog to the verification-unit cooperation function unit 47 (step S9). For example, the catalog verification command is issued when the catalog creator 10 presses a catalog generation button on the GUI. The catalog verification command is passed to the catalog verification function unit 62 through the verification-unit cooperation function unit 47 and the BG cooperation function unit 61 (step S10→step S11).

Upon receipt of the catalog verification command, the catalog verification function unit 62 performs a related-catalog analysis process (see the feature 1-1), and issues a reference destination catalog acquisition request to the BG cooperation function unit 61 (step S12→step S13). The reference destination catalog acquisition request is passed to the BG control function unit 41 though the BG cooperation function unit 61 and the verification-unit cooperation function unit 47 (step S14→step S15). Upon receipt of the reference destination catalog acquisition request, the BG control function unit 41 issues a catalog acquisition request to the catalog information management function unit 44 (step S16). Upon receipt of the catalog acquisition request, the catalog information management function unit 44 refers the DB and returns catalog information to the BG control function unit 41 (step S17→step S18). Upon receipt of the catalog information, the BG control function unit 41 passes the catalog information to the verification-unit cooperation function unit 47 (step S19). The catalog information is passed to the catalog verification function unit 62 through the verification-unit cooperation function unit 47 and the BG cooperation function unit 61 (step S20→step S21). Such processes (steps S12 to S21) are performed a plurality of times based on a catalog reference structure.

Upon receipt of the catalog information, the catalog verification function unit 62 performs the validation (see the feature 1-2 and the feature 1-3), generates an error message when a problem is found, and returns an error response to the BG cooperation function unit 61 (step S22→step S23→step S24). The error response is returned to the BG control function unit 41 through the BG cooperation function unit 61 and the verification-unit cooperation function unit 47 (step S25→step S26). Upon receipt of the error response, the BG control function unit 41 returns the error response to the catalog creation function unit 45 (step S27). Upon receipt of the error response, the catalog creation function unit 45 discards the catalog that is temporarily stored by the catalog information temporary storage function unit 34, and returns the error response to the BG control function unit 41 (step S28). The error response is returned to the GUI generation device 30 through the BG control function unit 41 and the GUI cooperation function unit 42 (step S29→step S30).

In this way, according to the present invention, it is possible to automate the validation of the catalog created by the cooperative service catalog creator 10 through the GUI. Note that FIG. 8 illustrates an example operation of the case where a problem is found as a result of the validation. However, when no problem is found, the catalog information temporary storage function unit 34 is adapted to store the catalog that is temporarily stored as it is in the DB.

As described above, the catalog verification device 60 in the embodiment of the present invention is the catalog verification device 60 that verifies the catalog created by the catalog creation assistance system that assists creation of the catalog used in the orchestrator 50. The catalog verification device 60 includes the BG cooperation function unit 61 and the catalog verification function unit 62. The BG cooperation function unit 61 is a function unit for communicating with the catalog creation device 40 included in the catalog creation assistance system. The catalog verification function unit 62 verifies the catalog created by the catalog creation assistance system based on the information acquired by the BG cooperation function unit 61. The catalog verification device 60 performs the validation of a catalog from the perspectives of a mandatory check, a syntax check, and the sequence of rules for cooperation among services by performing syntactic analysis of a file when the cooperative service catalog is created by and stored in the catalog creation assistance system. In this way, it is possible to automate the validation of the catalog created by the cooperative service catalog creator 10 through the GUI.

Specifically, the validation scheme is a validation scheme in light of the description of the catalog, targeted for the cooperative service catalog 71 (the feature 1). More specifically, the validation scheme is a validation scheme of acquiring information required for the validation of the cooperative service based on a reference relationship among the catalogs (the feature 1-1). In addition, the validation scheme is a validation scheme targeted for a mandatory check, a syntax check, and a check of rules for cooperation among services (the feature 1-2). Furthermore, the validation scheme is a validation scheme applicable independently of the type and content of the service (the feature 1-3).

Note that the present invention can be implemented not only as such a catalog verification device 60, but also as a catalog verification method that includes steps corresponding to characteristic function units included in such a catalog verification device 60, and as a program causing a computer to execute those steps. Needless to say, such a program can be distributed through recording media such as a CD-ROM and transmission media such as the Internet.

REFERENCE SIGNS LIST

10 Catalog creator
30 GUI generation device
31 Web server function unit
32 GUI generation function unit
33 BG cooperation function unit
34 Catalog information temporary storage function unit
35 GUI resource management function unit
36 Catalog definition information management function unit
40 Catalog creation device
41 BG control function unit
42 GUI cooperation function unit
43 Another-system cooperation function unit
44 Catalog information management function unit
45 Catalog creation function unit
46 Catalog template management function unit
47 Verification-unit cooperation function unit
50 Another system (orchestrator)
60 Catalog verification device
61 BG cooperation function unit
62 Catalog verification function unit

The invention claimed is:

1. A catalog verification device that verifies for verifying a catalog created by a catalog creation assistance system that assists creation of the catalog used in an orchestrator, the catalog verification device comprising:
    a BG (background) cooperation function unit, including one or more processors, configured to communicate with a catalog creation device included in the catalog creation assistance system; and
    a catalog verification function unit, including one or more processors, configured to verify the catalog created by the catalog creation assistance system based on information acquired by the BG cooperation function unit,
    wherein a validation scheme of the catalog is performed from perspectives of a mandatory check, a syntax check, and sequence of rules for cooperation among services by performing syntactic analysis of a file when the catalog for a cooperative service is created by and stored in the catalog creation assistance system.

2. The catalog verification device according to claim 1, wherein
    the validation scheme is a validation scheme in light of a description of the catalog, targeted for the cooperative service catalog.

3. The catalog verification device according to claim 2, wherein
the validation scheme is a validation scheme of acquiring information required for validation of a cooperative service based on a reference relationship among the catalogs.

4. The catalog verification device according to claim 2, wherein
the validation scheme is a validation scheme targeted for a mandatory check, a syntax check, and a check of rules for cooperation among services.

5. The catalog verification device according to claim 2, wherein
the validation scheme is a validation scheme applicable independently of a type and a content of the service.

6. A catalog verification method of verifying a catalog created by a catalog creation assistance system that assists creation of the catalog used in an orchestrator, the method causing a catalog verification device to perform:
a BG cooperation step of communicating with a catalog creation device included in the catalog creation assistance system; and
a catalog verification step of verifying the catalog created by the catalog creation assistance system based on information acquired in the BG cooperation step,
wherein a validation scheme of the catalog is performed from perspectives of a mandatory check, a syntax check, and sequence of rules for cooperation among services by performing syntactic analysis of a file when the catalog for a cooperative service is created by and stored in the catalog creation assistance system.

7. A non-transitory computer readable medium storing a program for causing a computer to function as the catalog verification device and perform:
a BG cooperation step of communicating with a catalog creation device included in a catalog creation assistance system; and
a catalog verification step of verifying a catalog created by the catalog creation assistance system based on information acquired in the BG cooperation step,
wherein a validation scheme of the catalog is performed from perspectives of a mandatory check, a syntax check, and sequence of rules for cooperation among services by performing syntactic analysis of a file when the catalog for a cooperative service is created by and stored in the catalog creation assistance system.

8. The non-transitory computer readable medium of claim 7, wherein the validation scheme is a validation scheme in light of a description of the catalog, targeted for the cooperative service catalog.

9. The non-transitory computer readable medium according to claim 8, wherein
the validation scheme is a validation scheme of acquiring information required for validation of a cooperative service based on a reference relationship among the catalogs.

10. The non-transitory computer readable medium according to claim 8, wherein
the validation scheme is a validation scheme targeted for a mandatory check, a syntax check, and a check of rules for cooperation among services.

11. The non-transitory computer readable medium according to claim 8, wherein
the validation scheme is a validation scheme applicable independently of a type and a content of the service.

12. The catalog verification method according to claim 5, wherein the validation scheme is a validation scheme in light of a description of the catalog, targeted for the cooperative service catalog.

13. The catalog verification method according to claim 12, wherein
the validation scheme is a validation scheme of acquiring information required for validation of a cooperative service based on a reference relationship among the catalogs.

14. The catalog verification method according to claim 12, wherein
the validation scheme is a validation scheme targeted for a mandatory check, a syntax check, and a check of rules for cooperation among services.

15. The catalog verification method according to claim 12, wherein
the validation scheme is a validation scheme applicable independently of a type and a content of the service.

* * * * *